(12) United States Patent
Nakane et al.

(10) Patent No.: US 7,793,693 B2
(45) Date of Patent: Sep. 14, 2010

(54) PNEUMATIC TIRE WITH SPECIFIED TOE RUBBER

(75) Inventors: Shinsuke Nakane, Tokyo (JP); Tsutomu Saeki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 1065 days.

(21) Appl. No.: 10/580,692

(22) PCT Filed: Dec. 8, 2004

(86) PCT No.: PCT/JP2004/018293

§ 371 (c)(1),
(2), (4) Date: Aug. 11, 2006

(87) PCT Pub. No.: WO2005/056310

PCT Pub. Date: Jun. 23, 2005

(65) Prior Publication Data

US 2007/0074799 A1 Apr. 5, 2007

(30) Foreign Application Priority Data

Dec. 12, 2003 (JP) .............................. 2003-414333

(51) Int. Cl.
  *B60C 15/06* (2006.01)
  *B60C 15/00* (2006.01)
  *B60C 5/14* (2006.01)
(52) U.S. Cl. .................. 152/510; 152/543; 152/547
(58) Field of Classification Search .................. 152/510, 152/543, 547
   See application file for complete search history.

(56) References Cited

U.S. PATENT DOCUMENTS 4,508,153 A * 4/1985 Tanaka et al. ............... 152/543

5,499,670 A 3/1996 Billieres

FOREIGN PATENT DOCUMENTS

| DE | 101 39 208 A1 | * | 3/2003 |
|---|---|---|---|
| EP | 0 448 905 A1 | | 10/1991 |
| JP | 59-216710 A | | 12/1984 |
| JP | 63-82802 A | | 4/1988 |
| JP | 02-231202 A | | 9/1990 |
| JP | 7-502471 A | | 3/1995 |
| JP | 07081335 A | * | 3/1995 |
| JP | 7-90125 A | | 4/1995 |
| JP | 09-267609 A | | 10/1997 |
| JP | 10-236115 A | | 9/1998 |
| JP | 2000-26657 A | | 1/2000 |
| JP | 2001-226526 A | | 8/2001 |
| JP | 2002-52909 A | | 2/2002 |
| JP | 2003-154806 A | | 5/2003 |
| JP | 2004066980 A | * | 3/2004 |
| JP | 2004-168244 A | | 6/2004 |

* cited by examiner

OTHER PUBLICATIONS

Notification of First Office Action issued Jul. 4, 2008, in corresponding CN Application No. 2004800346428, Chinese and English, 12 pages.

*Primary Examiner*—Adrienne C Johnstone
(74) *Attorney, Agent, or Firm*—Sughrue Mion, PLLC

(57) ABSTRACT

This invention relates to a pneumatic tire provided at its bead portion with a rubber chafer (4) and covered at its inner surface with an innerliner (5), wherein a toe rubber (6) is further arranged on a toe end part of the bead portion so as to overlap with the rubber chafer (4) and the innerliner (5) and locate at least outside the innerliner (5) at the overlapped portion with the innerliner (5), and a rubber composition A containing at least one of butyl rubber and halogenated butyl rubber as 20-40 mass % of a rubber component is used in the toe rubber (6).

4 Claims, 3 Drawing Sheets

PNEUMATIC TIRE WITH SPECIFIED TOE RUBBER

TECHNICAL FIELD

This invention relates to a pneumatic tire, and more particularly to a pneumatic tire having excellent air-retaining property and bead portion durability and capable of being used over a long period.

BACKGROUND ART

Heretofore, heavy duty tires such as a tire for truck and bus, a tire for construction vehicle and the like have been used under a very high load, so that it is generally and widely attempted to prevent settling of a bead portion, rim chafing and rim slippage and the like and to improve an air sealing property and the like by disposing a rubber chafer in at least a part of the bead portion contacting with a rim. In the tire provided with the rubber chafer, an innerliner is arranged in the inner face of the tire for the purpose of improving the air sealing property of the tire, in which an end of the innerliner is usually located in the vicinity of a toe end of the bead portion and a part of the innerliner overlaps partially with the rubber chafer. In this tire, however, the adhesiveness between the innerliner and the rubber chafer is poor, so that there is a problem that when a joint portion between the innerliner and the rubber chafer is particularly located in the vicinity of the toe end, cracks easily occur at an interface between the innerliner and the rubber chafer during the running on the market.

Moreover, when the innerliner is comprised of plural layers and a end of an outermost layer in the innerliner extends to the part contacting with the rim over the toe end, the outermost layer of the innerliner may ride up due to the rubbing or the like by contacting with the rim. To the contrary, when the end of the outermost layer in the innerliner is arranged so as not to arrive at the toe end, there is a problem that a rubber member of the bead portion is deteriorated by oxygen penetrated from the toe end.

On the other hand, there is proposed a tire in which the penetration of the oxygen from the toe end part is suppressed by using in the rubber chafer a rubber composition comprising 20-60 parts by weight in total of butyl rubber and/or halogenated butyl rubber and 80-40 parts by weight in total of cis-1,4-polyisoprene rubber and epoxidized cis-1,4-polyisoprene rubber as a rubber component (see JP-A-7-90125). In this case, however, there is a problem that the rubber chafer cannot play its original role sufficiently because a ratio of the butyl rubber and the halogenated butyl rubber in the rubber composition for the rubber chafer is higher than that in the conventional technique.

As the tire provided at its bead portion with the rubber chafer, there is proposed a tire in which a rubber layer having a high air impermeability is arranged on the toe end part of the bead portion to suppress the penetration of oxygen from the toe end part (see JP-A-H07-502471). In this case, however, it is necessary to use a rubber composition having a high ratio of a rubber component having a high air impermeability such as butyl rubber, halogenated butyl rubber or the like in the rubber layer for sufficiently increasing the air impermeability of the rubber layer arranged at the toe end part, so that it is difficult to assure the adhesiveness between the rubber layer and the rubber chafer.

As the tire provided at its bead portion with the rubber chafer, there is further proposed a tire in which an innerliner is arranged so as to entangle the bead core to improve the air-retaining property of the tire (see JP-A-2001-233013). Even in this case, however, the adhesiveness between the innerliner and the rubber chafer is still low, so that it is impossible to overcome a problem that cracks are easily generated at the interface between the innerliner and the rubber chafer during the running on the market.

SUMMARY OF THE INVENTION

It is, therefore, an object of the invention to solve the above-mentioned problems of the conventional techniques and to provide a pneumatic tire provided at its bead portion with a rubber chafer and covered at its inner surface with an innerliner, which hardly causes the rim chafing and is in the settling of the bead portion and prevents the occurrence of cracks at the interface between the rubber chafer and the innerliner and suppresses the penetration of oxygen from the toe end part.

The inventors have made various studies in order to achieve the above object and discovered that in the pneumatic tire provided at its bead portion with the rubber chafer and covered at its inner surface with the innerliner, an additional rubber layer is further arranged on the toe end part of the bead portion so as to overlap with the rubber chafer and the innerliner and a rubber composition containing a predetermined amount of a butyl rubber and/or a halogenated butyl rubber and having excellent adhesion to both the rubber chafer and the innerliner and anti-settling property is used in such an additional rubber layer (hereinafter referred to as a toe rubber), whereby the occurrence of cracks at the interface between the rubber chafer and the innerliner can be prevented and further the penetration of oxygen from the toe end part can be suppressed while controlling the rim chafing and the settling of the bead portion, and as a result the invention has been accomplished.

That is, the pneumatic tire according to the invention is a pneumatic tire provided at its bead portion with a rubber chafer and covered at its inner surface with an innerliner, characterized in that a toe rubber is further arranged on a toe end part of the bead portion so as to overlap with the rubber chafer and the innerliner and locate at least outside the innerliner at the overlapped portion with the innerliner, and a rubber composition A containing at least one of butyl rubber and halogenated butyl rubber as 20-40 mass % of a rubber component is used in the toe rubber. The term "toe end part" used herein means a toe end and a neighborhood thereof.

In a preferable embodiment of the pneumatic tire according to the invention, the toe rubber is arranged over at least a part of a region ranging from the toe end to not more than 30 mm in a direction along the inner surface of the tire and of a region ranging from the toe end to not more than 50 mm in a direction along a bead base line.

In another preferable embodiment of the pneumatic tire according to the invention, the toe rubber has a maximum thickness of not more than 2.5 mm.

In the other preferable embodiment of the pneumatic tire according to the invention, the innerliner is arranged up to a position from the toe end to not more than 10 mm outward in a radial direction of the tire.

In a further, preferable embodiment of the pneumatic tire according to the invention, the innerliner is turned back outward from the toe end in a widthwise direction of the tire. In this case, the penetration of oxygen from the toe end part into the inside of the bead portion can be prevented surely.

In a still further preferable embodiment of the pneumatic tire according to the invention, a rubber composition B containing at least one of butyl rubber and halogenated butyl rubber as at least 80 mass % of a rubber component is used in the innerliner, and a rubber composition C containing at least one of butyl rubber and halogenated butyl rubber as at most 10 mass % of a rubber component is used in the rubber chafer. In this case, the adhesiveness between the toe rubber and the innerliner and between the toe rubber and the rubber chafer can be improved surely.

According to the invention, there can be provided a pneumatic tire provided at its bead portion with a rubber chafer and covered at its inner face with an innerliner, which hardly causes the rim chafing and is low in the settling of the bead portion and does not generate cracks at the interface between the rubber chafer and the innerliner and suppresses the penetration of oxygen from a toe end part, wherein the toe rubber is further arranged on the toe end part of the bead portion so as to overlap with the rubber chafer and the innerliner and the rubber composition containing the predetermined total amount of the butyl rubber and/or the halogenated butyl rubber and having excellent adhesion to both the rubber chafer and the innerliner and anti-settling property is used in the toe rubber.

BEST MODE FOR CARRYING OUT THE INVENTION

Figure 1:
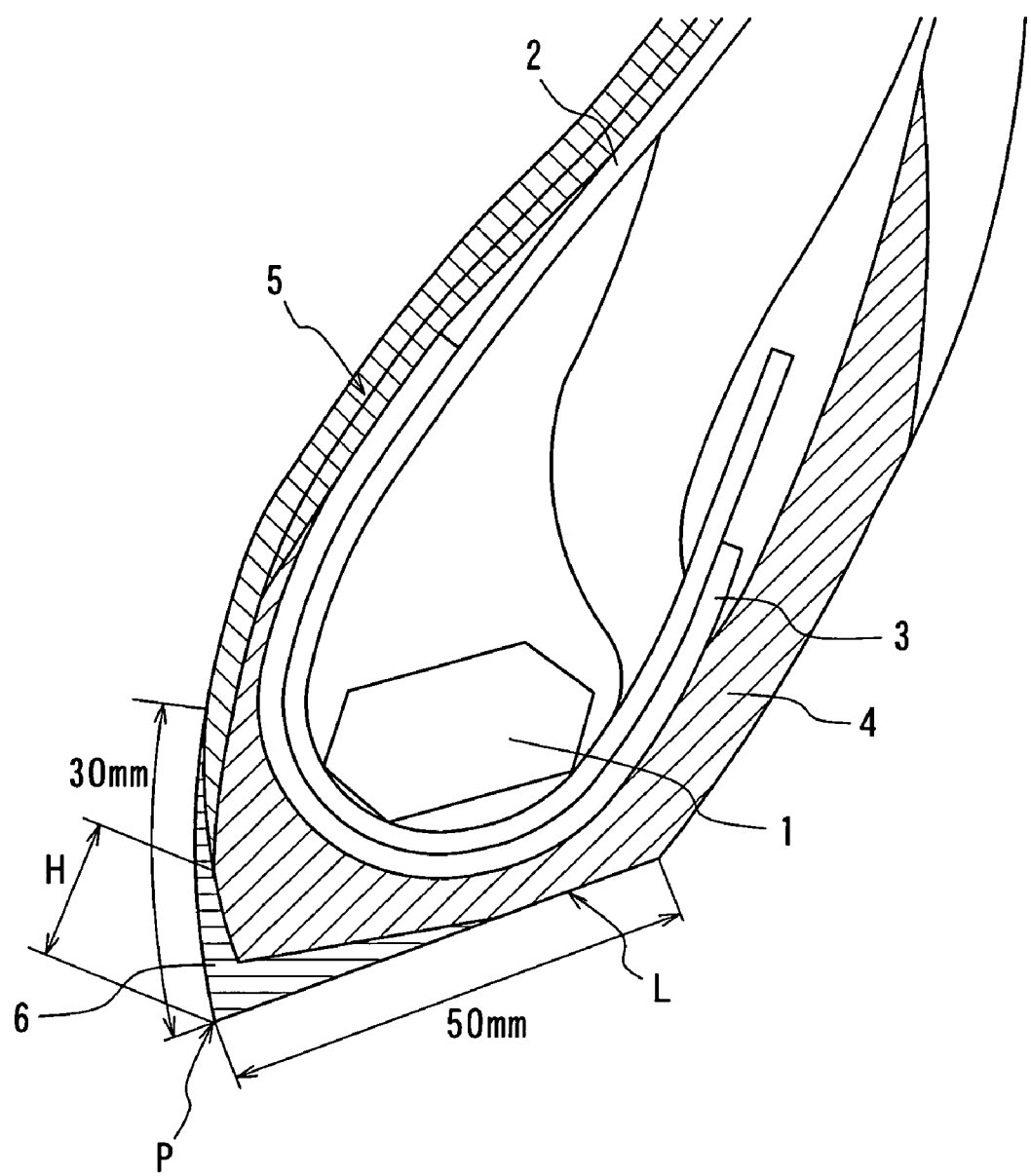
FIG. 1 shows an embodiment of the bead portion in the pneumatic tire according to the invention.
Figure 2:
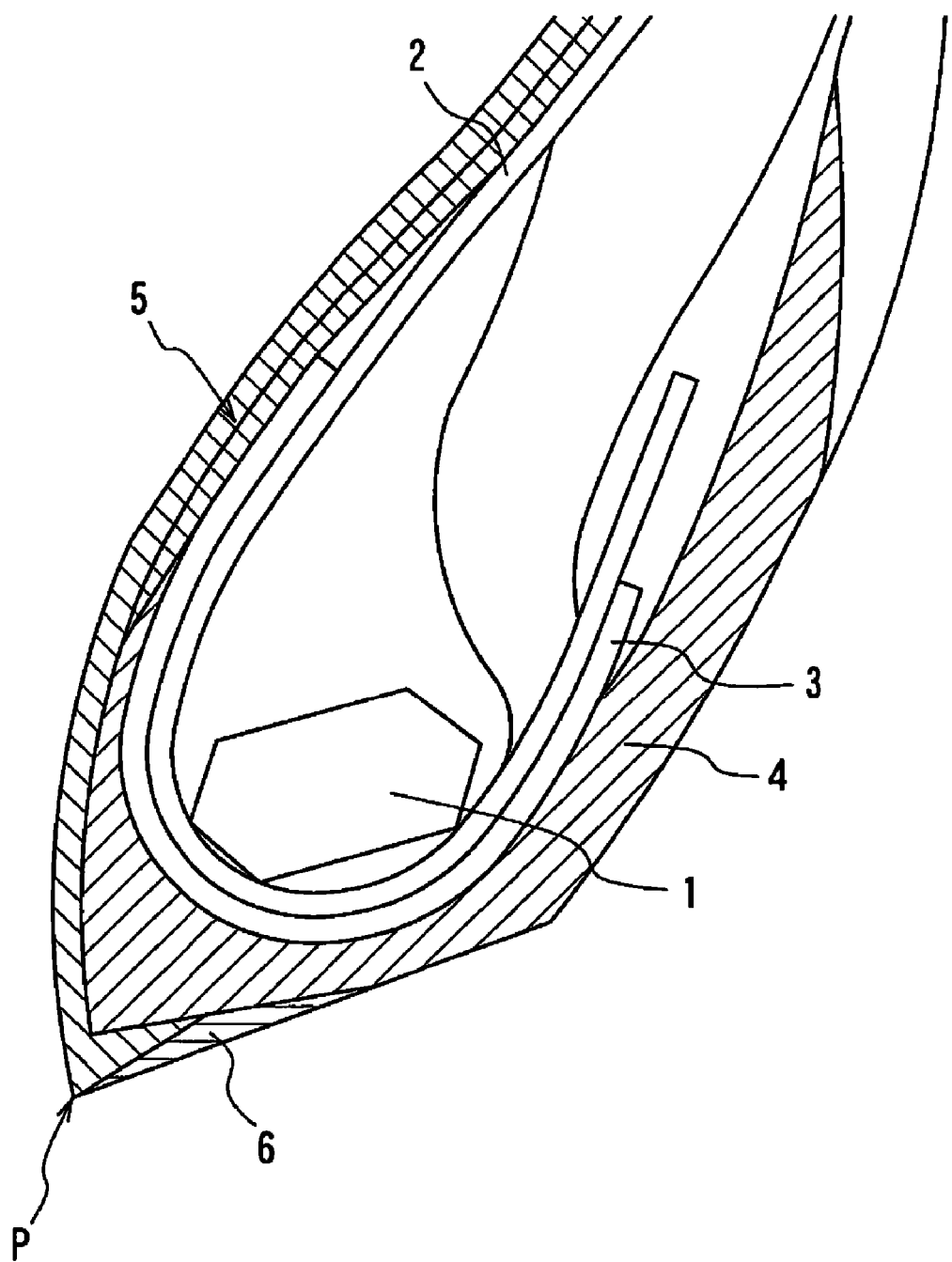
FIG. 2 shows another embodiment of the bead portion in the pneumatic tire according to the invention.
Figure 3:
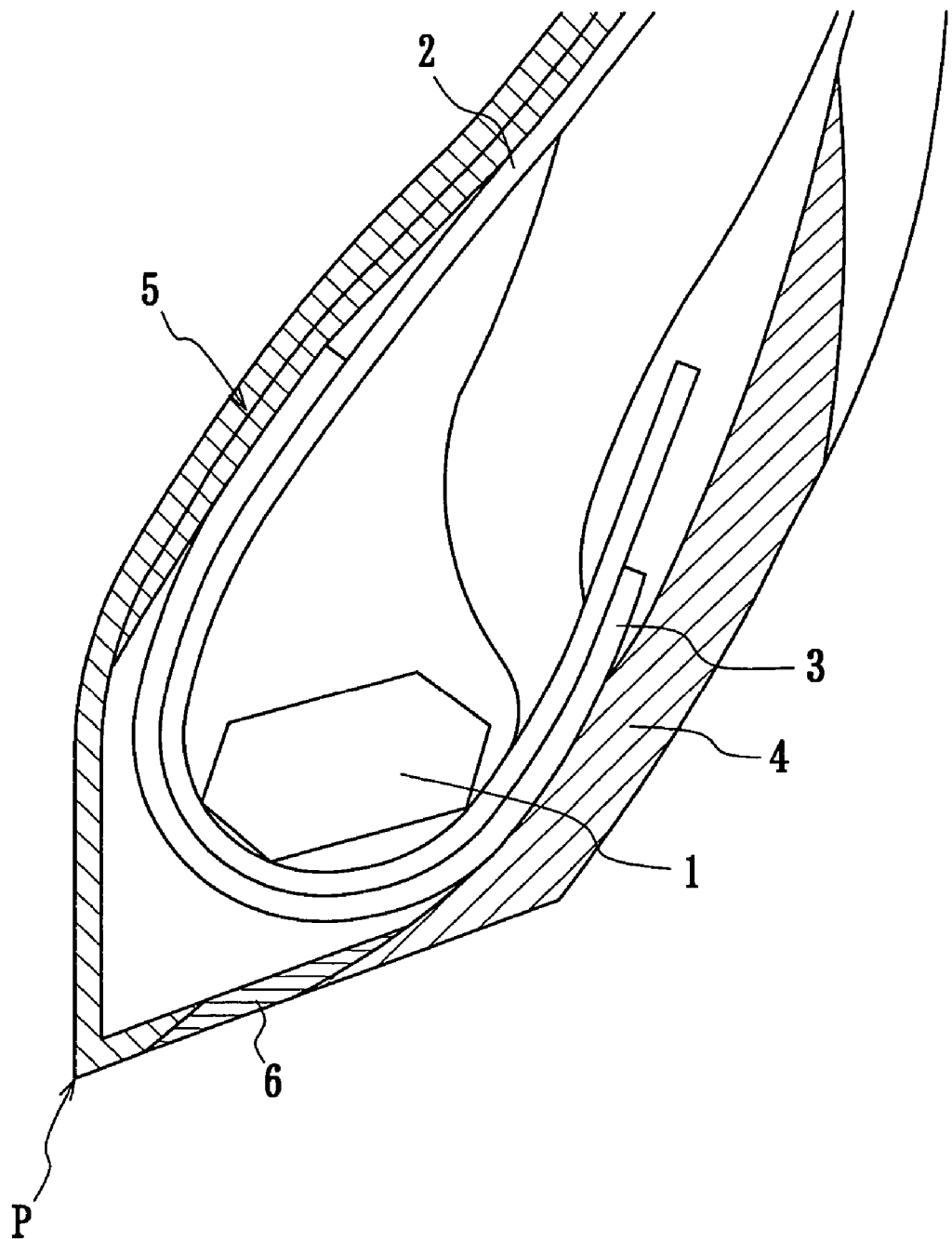
FIG. 3 shows the other embodiment of the bead portion in the pneumatic tire according to the invention.

The invention will be described in detail below with reference to the attached drawings. FIG. 1, FIG. 2 and FIG. 3 show an embodiment of the bead portion in the pneumatic tire according to the invention, respectively. The tires shown in FIG. 1, FIG. 2 and FIG. 3 comprise a carcass 2 consisting of a main body portion toroidally extending between bead cores 1 embedded in the bead portions and a turnup portion wound around the bead core 1 from an inside to outside in the widthwise direction of the tire, a wire chafer 3 arranged along the outer surface of the carcass 2 so as to envelop the bead core 1, a rubber chafer 4 arranged from the outside of the wire chafer 3 in the widthwise direction of the tire toward the inside thereof in the radial direction, an innerliner 5 arranged inside the main body portion of the carcass 2 in the widthwise direction of the tire so as to cover the inner surface of the tire, and a toe rubber 6 arranged at a toe end part of the bead portion so as to overlap with the rubber chafer 4 and the inner-liner 5. In the tire of the invention, the arrangement of the wire chafer 3 may be omitted, and the structure of the carcass 2 and the ply number thereof can be properly modified. In the illustrated tire, the cross-sectional shape of the bead core 1 is hexagonal, but it is not limited thereto and may be other polygons and so on.

In FIGS. 1 and 2, the toe rubber 6 is located outside both the rubber chafer 4 and the innerliner 5 (on the outer surface of the tire), but may be located inside the rubber chafer 4 at the overlapped portion with the rubber chafer 4 as in the tire shown in FIG. 3. In the tires shown in FIGS. 1, 2 and 3, the innerliner 5 is composed of two layers, but it may be composed of one layer or three or more layers.

In the pneumatic tire according to the invention, the rubber composition A containing at least one of butyl rubber and halogenated butyl rubber as 20-40 mass % of the rubber component is used in the toe rubber 6. The rubber composition A for the toe rubber is sufficiently high in the adhesiveness to both the usual rubber composition for the innerliner and rubber composition for the rubber chafer because the total content of the butyl rubber and the halogenated butyl rubber in the rubber component is 20-40 mass %. Therefore, the crack at the interface between the rubber chafer and the innerliner can be surely prevented and the durability of the tire can be improved. Furthermore, since the rubber composition A having the total content of the butyl rubber and the halogenated butyl rubber within the above-mentioned range is used in the toe rubber, the anti-settling property of the toe rubber is sufficiently high, and hence the tire according to the invention hardly causes the rim chafing and is small in the settling of the bead portion. Moreover, since the air impermeability of the toe rubber is higher than that of the usual rubber chafer, the penetration of oxygen from the toe end part can be suppressed as compared with the case that the toe rubber is not arranged, and the durability of the rubber member used in the bead portion and the internal pressure holding performance of the tire can be improved.

When the total content of the butyl rubber and the halogenated butyl rubber is less than 20 mass % in the rubber composition A used for the toe rubber of the pneumatic tire according to the invention, the adhesiveness after vulcanization between the outermost layer of the innerliner and the toe rubber is insufficient though the adhesiveness after vulcanization between the rubber chafer and the toe rubber can be ensured sufficiently, while when it exceeds 40 mass %, the adhesiveness after vulcanization between the outermost layer of the innerliner and the toe rubber can be sufficiently ensured, but the adhesiveness after vulcanization between the rubber chafer and the toe rubber is insufficient and the settling amount of the toe rubber is further increased to easily cause the rim chafing. As the halogenated butyl rubber are mentioned brominated butyl rubber, chlorinated butyl rubber and so on.

In the pneumatic tire of the invention, as shown in FIG. 1, it is preferable that the toe rubber 6 is arranged over at least a part of a region ranging from the toe end P to not more than 30 mm in a direction along the inner surface of the tire and of a region ranging from the toe end P to not more than 50 mm in a direction along a bead base line. As shown in FIG. 2, it is further preferable that the toe rubber 6 is arranged over at least a part of the region ranging from the toe end P to not more than 30 mm in the direction along the bead base line. When the toe rubber 6 is arranged over the region of more than 30 mm from the toe end P in the direction along the inner surface of the tire, air (oxygen) penetrates from a portion not having the innerliner to deteriorate the air-retaining property of the tire and also deteriorate the inner member. On the other hand, when the toe rubber 6 is arranged over the region of more than 50 mm from the toe end P in the direction along the bead base line L, the innerliner itself contacts with the rim and the anti-settling property is lacking.

In the toe rubber, the maximum thickness is preferably not more than 2.5 mm, and more preferably 1.0 mm-2.0 mm. When the maximum thickness of the toe rubber exceeds 2.5 mm, the settling of the toe rubber is apprehended because the anti-settling property of the toe rubber is relatively excellent but is smaller than that of the rubber chafer. Furthermore, the width of the toe rubber is not particularly limited, but is preferably within a range of 10-100 mm.

As shown in FIG. 1, the innerliner 5 in the pneumatic tire of the invention is preferably arranged up to a position from the toe end P to not more than 10 mm outward in the radial direction of the tire. When a shortest distance H between the innerliner 5 and the toe end P in the radial direction of the tire exceeds 10 mm, the internal pressure holding performance of the tire is deteriorated and further the penetration of oxygen from the toe end part cannot be suppressed sufficiently and hence the deterioration of the rubber member in the bead portion may not be suppressed sufficiently.

As shown in FIGS. 2 and 3, it is also preferable that the innerliner 5 in the pneumatic tire according to the invention is turned back outward from the toe end P in the widthwise direction of the tire. When the innerliner covers a zone from the inner face of the tire through the toe end P to a part of the bead base line L, the internal pressure holding performance of the tire is further improved and the penetration of oxygen from the toe end part is further and surely suppressed, and hence the deterioration of the rubber member in the bead portion can be further suppressed.

In the pneumatic tire of the invention, it is preferable that the rubber composition B containing at least one of the butyl rubber and the halogenated butyl rubber as at least 80 mass % of the rubber component is used in the innerliner, and the rubber composition C containing at least one of butyl rubber and halogenated butyl rubber as at most 10 mass % of the rubber component is used in the rubber chafer. In this case, the adhesiveness between the innerliner and the toe rubber and between the rubber chafer and the toe rubber can be ensured sufficiently, and the crack at the interface between the rubber chafer and the innerliner can be more surely prevented.

In the pneumatic tire of the invention, as the rubber component in the rubber compositions used for the toe rubber, the innerliner and the rubber chafer can be used a rubber component such as natural rubber, polybutadiene rubber or the like in addition to the above-mentioned butyl rubber and halogenated butyl rubber. These rubber compositions may be properly compounded with additives usually used in the rubber industry such as a filler, e.g. carbon black or the like, an antioxidant, a vulcanizing agent, a vulcanization accelerator, zinc oxide, stearic acid and so on within a scope of not damaging the object of the invention. As these additives can be preferably used commercially available ones. Moreover, the rubber compositions can be produced by compounding the rubber component with the various additives properly selected if necessary and milling, warming, extruding and so on.

The pneumatic tire of the invention is not particularly limited, but can be produced, for example, by properly stacking the toe rubber, the innerliner and the rubber chafer so as to provide a desired structure in a building step of a green tire and then vulcanizing as usual. The pneumatic tire of the invention is suitable for a use under a high load because it comprises the toe rubber and the rubber chafer, and is preferable as a heavy duty tire for a truck, a bus or the like. Moreover, as a gas filled into the pneumatic tire of the invention can be used usual air or air having a regulated partial oxygen pressure but also inert gases such as nitrogen, argon, helium and so on.

The following examples are given in illustration of the invention and are not intended as limitations thereof.

EXAMPLES

Rubber compositions according to a compounding recipe shown in Table 1 are prepared and the settling amounts thereof are measured by the following method. Results are shown in Table 1. Moreover, the rubber composition is compounded with 2 parts by mass of stearic acid, 6 parts by mass of zinc oxide, 3 parts by mass of process oil, 0.8 part by mass of a vulcanization accelerator (CZ), 3 parts by mass of sulfur and so on in addition to the rubber component and the carbon black shown in Table 1.

(1) Settling Amount

To the rubber vulcanized at 145° C. for 30 minutes is input a force of 300-200 N at 20 Hz for 16 minutes, and then a load of 200 N is added to measure a displacement amount from the vulcanized rubber before the test. The result is shown by an index on the basis that the displacement amount of the vulcanized rubber in Comparative Example 2 is 100. The lager the index value, the smaller the settling amount and the better the result.

Also, a tire for truck and bus (TBR) having a structure shown in FIG. 2 and a tire size of 11R225 14PR is prepared by using the above-described rubber composition in the toe rubber. In this tire, the toe rubber is arranged over a region of 0-30 mm from the toe end in the direction along the bead base line and the maximum thickness of the toe rubber is 1.8 mm. Furthermore, the component of the rubber composition used in the innerliner contains 100 mass % of IIR (*2), and the component of the rubber composition used in the rubber chafer contains 0 mass % of IIR (*2). With respect to the thus obtained tires, the adhesiveness before and after vulcanization between the innerliner and the toe rubber, and the adhesiveness after vulcanization between the rubber chafer and the toe rubber are evaluated by the following method. Results are shown in Table 1.

(2) Adhesiveness

A green tire is built and left to stand at 25° C. for 48 hours, and then the adhesiveness before vulcanization between the outermost layer of the innerliner and the toe rubber is visually observed. Then, the green tire is vulcanized at 145° C. for 40 minutes and left to stand for one day, and then the adhesiveness after vulcanization between the outermost layer of the innerliner and the toe rubber and between the rubber chafer and the toe rubber is visually observed. In the table, ○ shows that there is no problem, △ shows that there is a slight problem, and X shows that trouble is caused. Moreover, X in the evaluation of the adhesiveness after vulcanization between the outermost layer of the innerliner and the toe rubber shows that the interface between the outermost layer of the innerliner and the toe rubber emerges after the vulcanized and the leaving.

TABLE 1

|  |  |  | Comparative Example 1 | Comparative Example 2 | Comparative Example 3 | Example 1 | Example 2 | Example 3 | Example 4 | Example 5 |
|---|---|---|---|---|---|---|---|---|---|---|
| Formulation brief | Natural rubber | parts by mass | 100 | 85 | 50 | 70 | 70 | 35 | 30 | 40 |
|  | BR *1 |  | — | — | — | — | — | 35 | 30 | 40 |
|  | IIR *2 |  | — | 15 | 50 | 30 | 30 | 30 | 40 | 20 |
|  | Carbon black HAF |  | 70 | 70 | 70 | 70 | — | 70 | 70 | 70 |
|  | Carbon black GPF |  | — | — | — | — | 70 | — | — | — |

TABLE 1-continued

|  |  | Comparative Example 1 | Comparative Example 2 | Comparative Example 3 | Example 1 | Example 2 | Example 3 | Example 4 | Example 5 |
|---|---|---|---|---|---|---|---|---|---|
| Property | Settling Amount (Index) | 115 | 100 | 80 | 100 | 100 | 100 | 100 | 105 |
| Adhesiveness | Adhesiveness before vulcanization between toe rubber and outermost layer of innerliner | x | Δ | ○ | ○ | ○ | ○ | ○ | ○ |
|  | Adhesiveness after vulcanization between toe rubber and outermost layer of innerliner | x | Δ | ○ | ○ | ○ | ○ | ○ | ○ |
|  | Adhesiveness after vulcanization between toe rubber and rubber chafer | ○ | ○ | x | ○ | ○ | ○ | ○ | ○ |

*1 Polybutadiene rubber, BR01 made by JSR Corporation
*2 Brominated butyl rubber, BROMOBUTYL 2255 made by JSR Corporation As seen from Table 1, the rubber compositions of Examples 1-5 wherein the content of the bominated butyl rubber in the rubber component is within the range defined in the invention have sufficient anti-settling property. Also, the tires of Examples 1-5 using the above rubber composition in the toe rubber are excellent in the adhesiveness before and after vulcanization between the innerliner and the toe rubber and the adhesiveness after vulcanization between the rubber chafer and the toe rubber.

On the other hand, the tire of Comparative Example 1 wherein the rubber composition having an excellent anti-settling property but not containing the brominated butyl rubber is used in the toe rubber is poor in the adhesiveness before and after vulcanization between the innerliner and the toe rubber. Also, the tire of Comparative Example 2 wherein the rubber composition having the brominated butyl rubber content in the rubber component of less than 20 mass % is used in the toe rubber has somewhat a problem in the adhesiveness before and after vulcanization between the innerliner and the toe rubber. Furthermore, the tire of Comparative Example 3 wherein the rubber composition having the brominated butyl rubber content in the rubber component of more than 40 mass % is used in the toe rubber is poor in the adhesiveness after vulcanization between the rubber chafer and the toe rubber.

The invention claimed is:

1. A pneumatic tire provided at its bead portion with a rubber chafer and covered at its inner surface with an innerliner, characterized in that a toe rubber is further arranged on a toe end part of the bead portion so as to overlap with the rubber chafer and the innerliner and located at least outside the innerliner at the overlapped portion with the innerliner, and a rubber composition A containing at least one of butyl rubber and halogenated butyl rubber as 20-40 mass % of a rubber component is used in the toe rubber, wherein the innerliner is turned back outward from the toe end in a widthwise direction of the tire.

2. A pneumatic tire according to claim 1, wherein the toe rubber is arranged over at least a part of a region ranging from the toe end to not more than 30 mm in a direction along the inner surface of the tire and of a region ranging from the toe end to not more than 50 mm in a direction along a bead base line.

3. A pneumatic tire according to claim 1, wherein the toe rubber has a maximum thickness of not more than 2.5 mm.

4. A pneumatic tire according to claim 1, wherein a rubber composition B containing at least one of butyl rubber and halogenated butyl rubber as at least 80 mass % of a rubber component is used in the innerliner, and a rubber composition C containing at least one of butyl rubber and halogenated butyl rubber as at most 10 mass % of a rubber component is used in the rubber chafer.

* * * * *